April 1, 1941.  F. K. FISCHER  2,237,029

HIGH PRESSURE HEAD

Filed April 9, 1938

WITNESSES:

INVENTOR
FREDERICK K. FISCHER
BY
ATTORNEY

Patented Apr. 1, 1941

2,237,029

UNITED STATES PATENT OFFICE 2,237,029

HIGH PRESSURE HEAD

Frederick K. Fischer, Prospect Park, Pa., assignor to Westinghouse Electric & Manufacturing Company, East Pittsburgh, Pa., a corporation of Pennsylvania Application April 9, 1938, Serial No. 201,043

2 Claims. (Cl. 220—55)

My invention relates to closures for pressure vessels and more particularly to covers or closure members for high-pressure heads of heat exchange apparatus.

An object of my invention is the provision of a closure for high-pressure heads wherein both the internal pressure load and the sealing load are transmitted to a shear ring.

A further object of my invention is the provision of a closure for high-pressure heads wherein both the internal pressure load and the sealing load are transmitted to a shear ring by bolts under compression.

Another object of my invention is the provision of a closure for a high-pressure head having sealing engagement with said head and an arrangement of bolts under compression for applying sealing pressure, the heads of the bolts being accessible at all times for adjustment of the sealing pressure.

These and other objects are effected by my invention as will be apparent from the following description and claims taken in connection with the accompanying drawing, forming a part of this application, in which:

Figure 1:
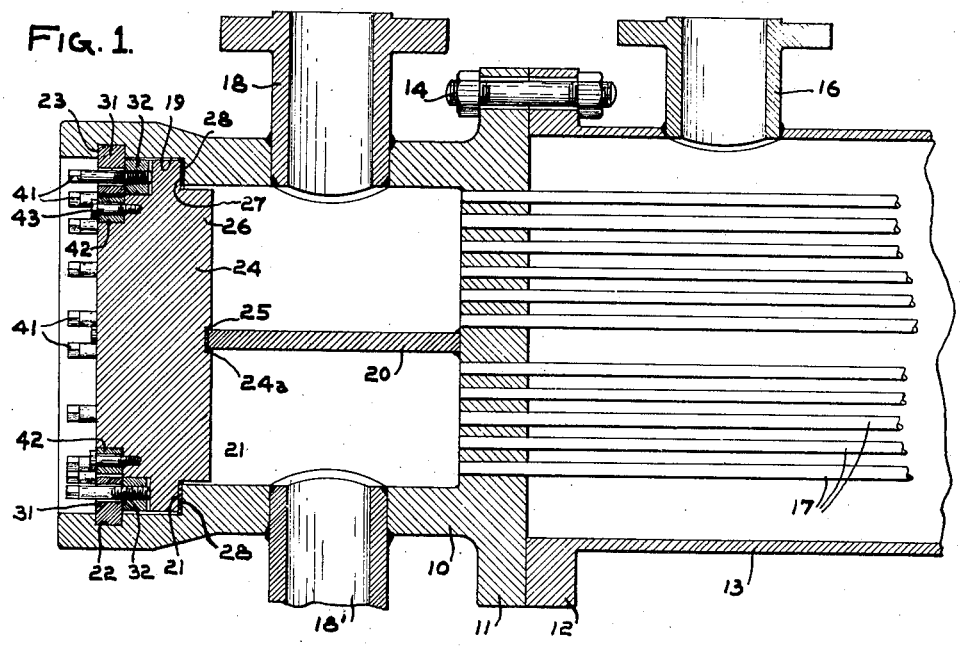
Fig. 1 is a longitudinal sectional view of a portion of a tubular heat exchanger constructed in accordance with the invention.
Figure 3:
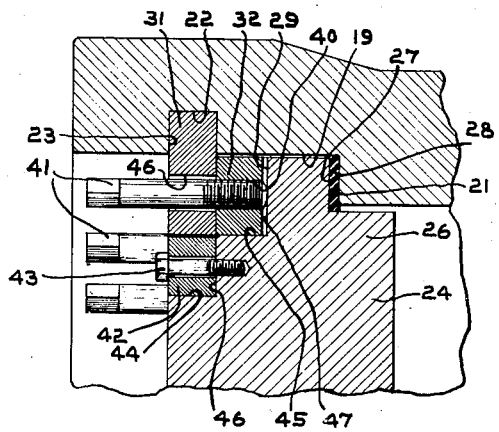

In the drawing there is shown a high-pressure head 10 in the form of a hollow cylindrical body provided at one end with a flange 11 by which it is secured to a flange 12 of the shell 13 of a tubular heat exchanger, by suitable means, such as bolts 14. The shell 13 has an inlet 16. The tubes 17 have terminal portions secured in openings in the tube plate wall of the head in the usual way, and extend longitudinally through the shell to the reverse head (not shown) of the heat exchanger.

In the construction herein illustrated, the heat exchanger is of the two-pass type and the high-pressure head 10 is provided with an inlet 18 for the admission of fluid under high pressure and an outlet 18'. A partition 20 separates the chamber into inlet and outlet sections. Preferably, the partition is welded to the tube plate wall of the head. The outer edge of the partition is received in a groove 24a in the cover 24, packing 25 being provided in the bottom of the groove to prevent leakage around the partition. The outer end of the cylindrical wall of the head 10 is counterbored at 19 to form the radially-extending shoulder or sealing surface 21. A groove 22 is formed in the cylindrical wall of the counterbore 19 to provide a radially-extending thrust shoulder 23.

Within the counterbore 19 and closely fitting the same is a relatively thick cover 24 having an inner circular portion 26 of reduced diameter loosely fitting the interior of the head 10. The cover has a radially-extending, inwardly-facing, circular sealing surface 27 cooperating with the opposed sealing surface 21 of the head to compress therebetween a gasket 28. Where conditions are suitable, the gasket may be omitted and direct contact of the sealing surfaces 21 and 27 relied upon for sealing.

Figure 2:
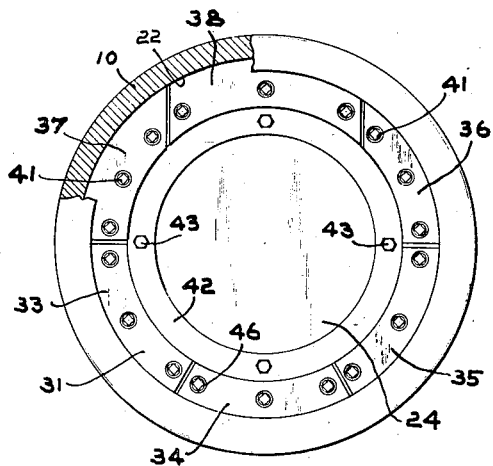
Fig. 2 is an end elevational view of the structure shown in Fig. 1 with a portion broken away for the sake of clearness; and, Fig. 3 is an enlarged sectional view of a portion of the structure of Fig. 1.

A shear ring 31 closely fits in the groove 22 and abuts the thrust shoulder 23. To facilitate assembly of the shear ring 31 in the groove 22, the former is divided into a plurality of segments or shear pieces, for example, 33, 34, 35, 36, 37, and 38. As shown in Fig. 2, shear pieces 33, 34, and 35 are of similar shape, being segments of the annular thrust ring with radial edges. Each of the shear pieces 36 and 37 has one radial edge and the other edge is such that the remaining shear piece 38 may have parallel edges.

Between the inner radial face of the shear ring 31 and the opposde outer radial face 29 of the cover 24, there is disposed an annular pressure member 32 having a plurality of threaded holes 40 extending therethrough parallel to the longitudinal axis of the head 10. Bolts 41 are provided having their threaded portions rotatably received in the threaded holes 40 with their points contacting the outer face 29 of the cover. The shear ring 31 is provided with a plurality of holes 46 aligned with the threaded holes 40 in the pressure ring 32 and through which the bolts 41 freely extend, whereby the bolt heads are accessible at all times for tightening or loosening thereof.

A retaining ring 42 is aligned radially with the shear ring 31 with the outer periphery of the former closely abutting the inner periphery of the latter to positively prevent displacement of the shear pieces 33, 34, 35, 36, 37 and 38. The outer end of the cover is formed with stepped portions 44 and 45 of lesser diameter than the cover and providing annular recesses 46 and 47 for reception of the pressure ring 32 and the retaining ring 42 respectively. Movement of the retaining ring 42 in a direction transversely of the head 10 is limited by the annular stepped portion 44 on the cover 24, and in an axial direction by bolts 43.

Pressure applied to the inner face of the cover 24 will be transmitted to the bolts 41 and by compression of the latter to the pressure ring 32, which will distribute the pressure uniformly to the various pieces or segments of the shear ring 31 and thence to the thrust shoulder 23 of the head 10. Due to the accessibility of the bolts 41, they can be adjusted at any time, even during operation of the heat exchanger, to vary the sealing pressure on the gasket 28. It should be noted that all of the load is transmitted by the bolts in compression in contrast to the common practice of loading the bolts in tension.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. Apparatus of the character described comprising a hollow, pressure-sustaining body member having a sealing surface and a thrust shoulder, a cover having a sealing surface, a sectional shear ring abutting the thrust shoulder, a pressure ring located between the cover and the shear ring, and abutting the latter, and bolts threadedly mounted in the pressure ring and cooperating with the cover for transmitting pressure uniformly from the latter to the former, said sectional shear ring being provided with passages therethrough aligned with said bolts and through which the heads of said bolts extend for adjustment thereof at all times from exteriorly of the body member to vary the sealing pressure on the sealing surfaces.

2. Apparatus of the character described comprising a body member including an annular wall portion having an interior outwardly-facing sealing surface and a bore extending from said surface to the outer end of the wall portion, said wall portion having an annular groove opening into the bore and arranged intermediately of said surface and said outer end and providing an inwardly-facing thrust shoulder, a cover having a sealing surface cooperating with said first-mentioned sealing surface, a plurality of shear pieces in abutting relation to said thrust shoulder, a pressure ring abutting the inner surfaces of the shear pieces, and bolts under compression carried thereby and contacting the cover, said bolts being adjustable at all times from exteriorly of the body member to vary the sealing pressure at the sealing surfaces.

FREDERICK K. FISCHER.